United States Patent
Ripa

(10) Patent No.: US 11,150,882 B2
(45) Date of Patent: Oct. 19, 2021

(54) NAMING ROBOTIC PROCESS AUTOMATION ACTIVITIES ACCORDING TO AUTOMATICALLY DETECTED TARGET LABELS

(71) Applicant: UiPath Inc., New York, NY (US)

(72) Inventor: Bogdan Ripa, Buchare (RO)

(73) Assignee: UiPath Inc., New York, NY (US)

( * ) Notice: Subject to any disclaimer, the term of this patent is extended or adjusted under 35 U.S.C. 154(b) by 120 days.

(21) Appl. No.: 16/601,110

(22) Filed: Oct. 14, 2019

(65) Prior Publication Data

US 2021/0109722 A1  Apr. 15, 2021

(51) Int. Cl.
| G06F 8/38 | (2018.01) |
| G06F 3/0482 | (2013.01) |
| G06F 3/0484 | (2013.01) |
| H04L 12/28 | (2006.01) |

(52) U.S. Cl.
CPC .............. *G06F 8/38* (2013.01); *G06F 3/0482* (2013.01); *G06F 3/04847* (2013.01); *H04L 12/28* (2013.01)

(58) Field of Classification Search
CPC ...... G06F 8/38; G06F 3/0482; G06F 3/04847; H04L 12/28
See application file for complete search history.

(56) References Cited

U.S. PATENT DOCUMENTS

| 9,600,401 | B1 | 3/2017 | Haischt et al. |
| 9,928,106 | B2 * | 3/2018 | Hosabettu ............. G06F 9/4843 |
| 10,127,202 | B2 * | 11/2018 | Xiong .................... G06F 16/986 |
| 10,365,799 | B2 * | 7/2019 | Hosbettu ............... G06T 7/0085 |
| 10,430,324 | B2 * | 10/2019 | Hamid ................. G06F 11/3696 |
| 10,572,278 | B2 * | 2/2020 | Klemenz ................. G06F 9/451 |
| 10,679,060 | B2 * | 6/2020 | Mietke .................. G06F 3/0482 |
| 10,769,427 | B1 * | 9/2020 | Gajera ................ G06K 9/6262 |
| 10,812,627 | B2 * | 10/2020 | Berg .................... G06F 11/3452 |
| 10,839,404 | B2 * | 11/2020 | Ramamurthy ........ G06F 16/907 |
| 10,871,977 | B2 * | 12/2020 | Hanke ................ G06F 9/45512 |
| 10,956,181 | B2 * | 3/2021 | Banne ..................... G06F 9/547 |
| 10,960,541 | B2 * | 3/2021 | S Nanal ............. G06F 11/3672 |
| 10,970,097 | B2 * | 4/2021 | Rashid .................... G06F 9/451 |
| 2004/0030991 | A1 | 2/2004 | Hepworth et al. |

(Continued)

OTHER PUBLICATIONS

Gao, Junxiong, et al. "Automated robotic process automation: A self-learning approach." OTM Confederated International Conferences"On the Move to Meaningful Internet Systems". Springer, Cham, 2019. (Year: 2019).*

(Continued)

*Primary Examiner* — Matthew J Brophy
(74) *Attorney, Agent, or Firm* — Law Office of Andrei D Popovici, PC

(57) ABSTRACT

Some embodiments describe improvements to an interface for designing robotic process automation (RPA) software. In response to receiving user input that selects a target UI element for an RPA activity (e.g., mouse click, text input), some embodiments automatically identify a label element co-displayed with the respective target element. An activity configuration interface displays an activity name and/or description using the label element as a descriptor and/or substitute for the target element, making the interface more intuitive and accessible to developers without a programming background.

19 Claims, 12 Drawing Sheets

(56) References Cited

U.S. PATENT DOCUMENTS

| | | | | |
|---|---|---|---|---|
| 2013/0263090 | A1* | 10/2013 | Polk | G06F 11/3672 |
| | | | | 717/124 |
| 2017/0001308 | A1 | 1/2017 | Bataller et al. | |
| 2017/0031880 | A1* | 2/2017 | Xiong | G06F 40/14 |
| 2017/0052824 | A1 | 2/2017 | Sharma et al. | |
| 2017/0147296 | A1 | 5/2017 | Kumar et al. | |
| 2017/0228119 | A1* | 8/2017 | Hosbettu | G06Q 10/00 |
| 2017/0286155 | A1* | 10/2017 | Hosabettu | G06F 3/04842 |
| 2017/0352041 | A1* | 12/2017 | Ramamurthy | G06F 40/226 |
| 2018/0321831 | A1* | 11/2018 | Klemenz | G06F 9/451 |
| 2018/0329813 | A1* | 11/2018 | Hamid | G06F 11/3688 |
| 2019/0324781 | A1* | 10/2019 | Ramamurthy | G06N 3/088 |
| 2020/0034281 | A1* | 1/2020 | Hamid | G06F 11/3664 |
| 2020/0073686 | A1* | 3/2020 | Hanke | G06F 11/368 |
| 2020/0097725 | A1* | 3/2020 | Mietke | G06N 20/00 |
| 2020/0287992 | A1* | 9/2020 | Berg | H04L 67/36 |
| 2020/0371818 | A1* | 11/2020 | Banne | G06F 9/547 |
| 2020/0401430 | A1* | 12/2020 | Berg | G06K 9/344 |
| 2020/0401431 | A1* | 12/2020 | Rashid | G06F 40/14 |
| 2021/0026594 | A1* | 1/2021 | Kessler | G10L 15/1815 |
| 2021/0026606 | A1* | 1/2021 | Kessler | G06F 3/167 |
| 2021/0027774 | A1* | 1/2021 | Kessler | G06F 3/0484 |
| 2021/0072969 | A1* | 3/2021 | Mei | G06F 11/30 |

OTHER PUBLICATIONS

Issac, Ruchi, Riya Muni, and Kenali Desai. "Delineated analysis of robotic process automation tools." 2018 Second International Conference on Advances in Electronics, Computers and Communications (ICAECC). IEEE, 2018 (Year: 2018).*

UiPath, Compiled pages from web-based UiPath user guide, downloaded on Oct. 23, 2019, believed publicly available at least as of Oct. 13, 2019.

Servicenow, "Create Custom Activities", https://docs.servicenow.com/bundle/helsinki-servicenow-platform/page/administer/orchestration-activity-designer/task/t_CreateCustomActivities.html, Helsinki, Apr. 14, 2017.

K2, "Activity General Properties", downloaded on Nov. 7, 2019 from https://help.k2.com/onlinehelp/k2blackpearl/userguide/4.7/default.htm#Thick_Client_Wizards/Default_Act_Wizard/Activity_General_Properties.htm, archive.org indicates that the document was available on Oct. 9, 2018.

Oracle, "Oracle Workflow Developer's Guide", Release 2.6.3, Part No. B10284-02, downloaded on Nov. 7, 2019 from https://docs.oracle.com/cd/B12037_01/workflow.101/b10284/defcom46.htm, archive.org indicates that the document was available on Oct. 19, 2013.

European Patent Office, European Search Report Published Apr. 21, 2021 for European Patent Application No. EP 20200407.

* cited by examiner

NAMING ROBOTIC PROCESS AUTOMATION ACTIVITIES ACCORDING TO AUTOMATICALLY DETECTED TARGET LABELS

BACKGROUND

The invention relates to robotic process automation (RPA), and in particular to systems and methods for automatically identifying a user interface element targeted for an activity such as a mouse click or a text input.

RPA is an emerging field of information technology aimed at improving productivity by automating repetitive computing tasks, thus freeing human operators to perform more intellectually sophisticated and/or creative activities. Notable tasks targeted for automation include extracting structured data from documents, and interacting with user interfaces, for instance to fill in forms, among others.

A distinct prong of RPA development is directed at simplifying the programming and management of software robots, with the ultimate goal of extending the reach of RPA technology to users that lack advanced programming skills or training. One way of making RPA more accessible is the development of RPA-oriented integrated development environments (IDEs) which allow the programming of robots via graphical user interface (GUI) tools, instead of coding per se. There is a strong interest in making such GUI tools as intuitive and user-friendly as possible, to attract a broad audience of developers.

SUMMARY

According to one aspect, a method of designing robotic process automation (RPA) software comprises employing at least one hardware processor of a computer system, in response to receiving a user input indicating an RPA activity, to expose an activity configuration user interface (UI) enabling a user to configure parameters of the RPA activity. The method further comprises in response, employing the at least one hardware processor to receive a user input selecting a target element for the RPA activity from a plurality of UI elements displayed within a target UI. In response to receiving the user input selecting the target element, the method further comprises employing the at least one hardware processor to automatically select a user-facing label of the target element, the user-facing label selected from the plurality of UI elements according to a relative on-screen position of the user-facing label with respect to the target element, and to display the user-facing label within the activity configuration UI. The method further comprises employing the at least one hardware processor to determine a code label characterizing the target element within a source code of the target UI, and to output an RPA script formulated according to the RPA activity and to the target element, the RPA script including the code label. Executing the RPA script on a client machine causes the client machine to automatically identify a runtime instance of the target element within a runtime UI exposed by the client machine, the runtime instance of the target element identified according to the code label, and to automatically carry out an operation that reproduces a result of an interaction of a human operator with the runtime instance of the target element, the operation determined according to the RPA activity.

According to another aspect, a computer system comprises at least one hardware processor configured to execute an automation target application and a script authoring application. The automation target application is configured to expose a target user interface (UI) comprising a plurality of UI elements. The script authoring application is configured, in response to receiving a user input indicating a robotic process automation (RPA) activity, to expose an activity configuration UI enabling a user to configure parameters of the RPA activity. The script authoring application is further configured, in response, to receive a user input selecting a target element for the RPA activity from the plurality of UI elements displayed within a target UI. The script authoring application is further configured, in response to receiving the user input selecting the target element, to automatically select a user-facing label of the target element, the user-facing label selected from the plurality of UI elements according to a relative on-screen position of the user-facing label with respect to the target element, and to display the user-facing label within the activity configuration UI. The script authoring application is further configured to determine a code label characterizing the target element within a source code of the target UI, and to output an RPA script formulated according to the RPA activity and to the target element, the RPA script including the code label. Executing the RPA script on a client machine causes the client machine to automatically identify a runtime instance of the target element within a runtime UI exposed by the client machine, the runtime instance of the target element identified according to the code label, and to automatically carry out an operation that reproduces a result of an interaction of a human operator with the runtime instance of the target element, the operation determined according to the RPA activity.

According to another aspect, a non-transitory computer-readable medium stores instructions which, when executed by at least one hardware processor of a computer system configured to expose a target user interface (UI) comprising a plurality of UI elements, cause the computer system, in response to receiving a user input indicating a robotic process automation (RPA) activity, to expose an activity configuration UI enabling a user to configure parameters of the RPA activity. The instructions further cause the computer system to receive a user input selecting a target element for the RPA activity from a plurality of UI elements displayed within the target UI. The instructions further cause the computer system, in response to receiving the user input selecting the target element, to automatically select a user-facing label of the target element, the user-facing label selected from the plurality of UI elements according to a relative on-screen position of the user-facing label with respect to the target element, and to display the user-facing label within the activity configuration UI. The instructions further cause the computer system to determine a code label characterizing the target element within a source code of the target UI, and to output an RPA script formulated according to the RPA activity and to the target element, the RPA script including the code label. Executing the RPA script on a client machine causes the client machine to automatically identify a runtime instance of the target element within a runtime UI exposed by the client machine, the runtime instance of the target element identified according to the code label, and to automatically carry out an operation that reproduces a result of an interaction of a human operator with the runtime instance of the target element, the operation determined according to the RPA activity.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
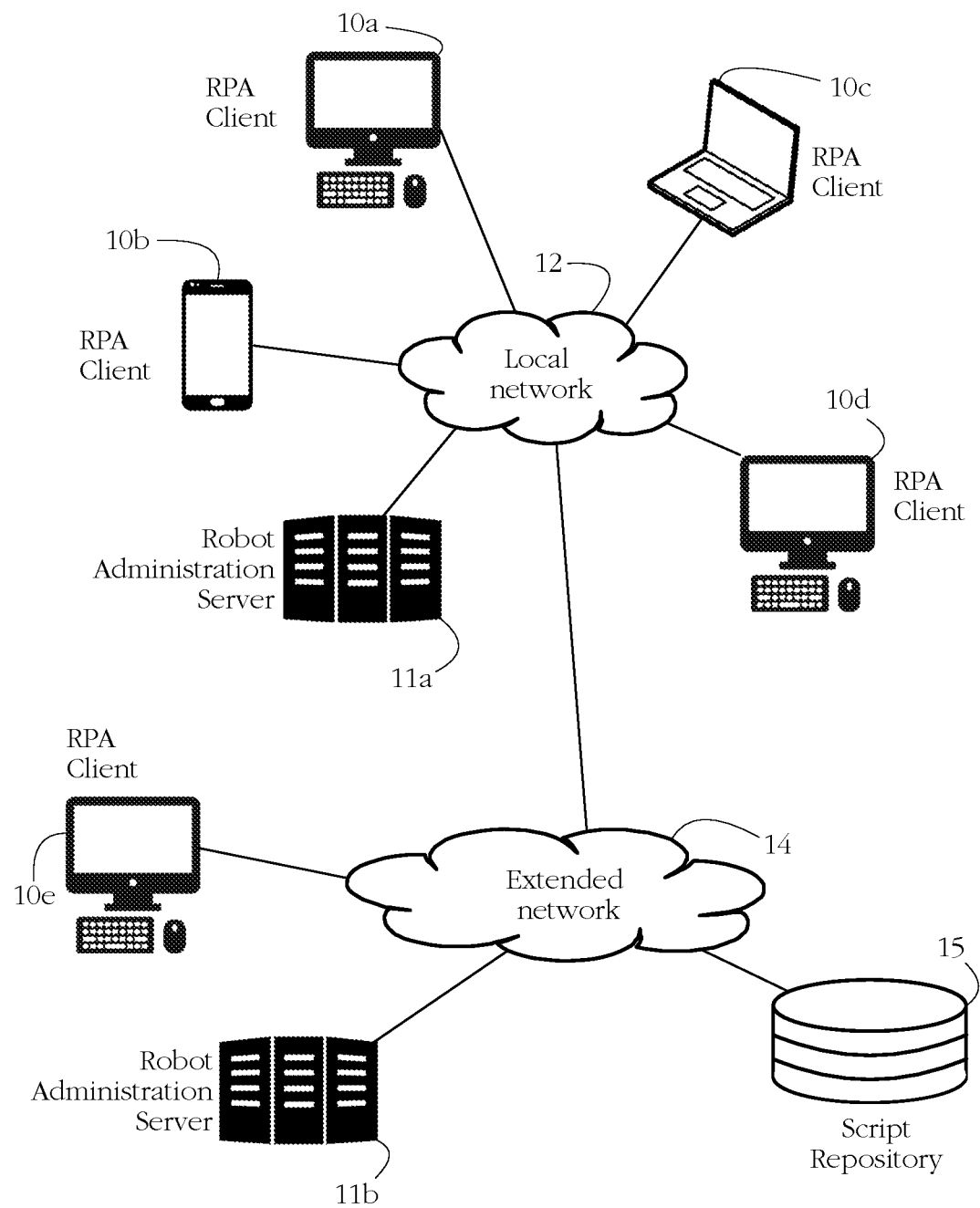
FIG. 1 shows an exemplary robotic process automation (RPA) system according to some embodiments of the present invention.

FIG. 1 shows an exemplary robotic process automation system according to some embodiments of the present invention. Each of a plurality of RPA clients $10a$-$e$ represents a computing device having at least a hardware processor, a memory unit and a network adapter enabling the respective RPA client to connect to a computer network and/or to other computing devices. Exemplary RPA clients $10a$-$e$ include personal computers, laptop and tablet computers, and mobile telecommunication devices (e.g., smartphones), among others. In an exemplary use case scenario, RPA clients $10a$-$d$ represent desktop computers belonging to an accounting or a human resources department of a company. The illustrated RPA clients $10a$-$d$ are interconnected by a local communication network 12, which may comprise a local area network (LAN). Clients $10a$-$d$ may further access an extended network 14 which may comprise a wide-area network (WAN) and/or the Internet. In the exemplary configuration of FIG. 1, RPA client $10e$ is connected directly to extended network 14. Such a client may represent a mobile computer, such as a laptop, tablet computer, or mobile telephone that connects to network 14 at various access points.

In a typical RPA scenario, an employee of a company uses a business application (e.g., word processor, spreadsheet editor, browser, email application) to perform a repetitive task, for instance to issue invoices to various business clients. To actually carry out the respective task, the employee performs a sequence of operations/actions, which is herein deemed a business process. Exemplary operations forming a part of an invoice-issuing business process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. RPA software executing on the employee's computer may automate the respective business process by mimicking the set of operations performed by the respective human operator in the course of carrying out the respective task. Exemplary processes typically targeted for such automation include processing of payments, invoicing, communicating with business clients (e.g., distribution of newsletters and/or product offerings), internal communication (e.g., memos, scheduling of meetings and/or tasks), payroll processing, etc.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state.

Figure 2:
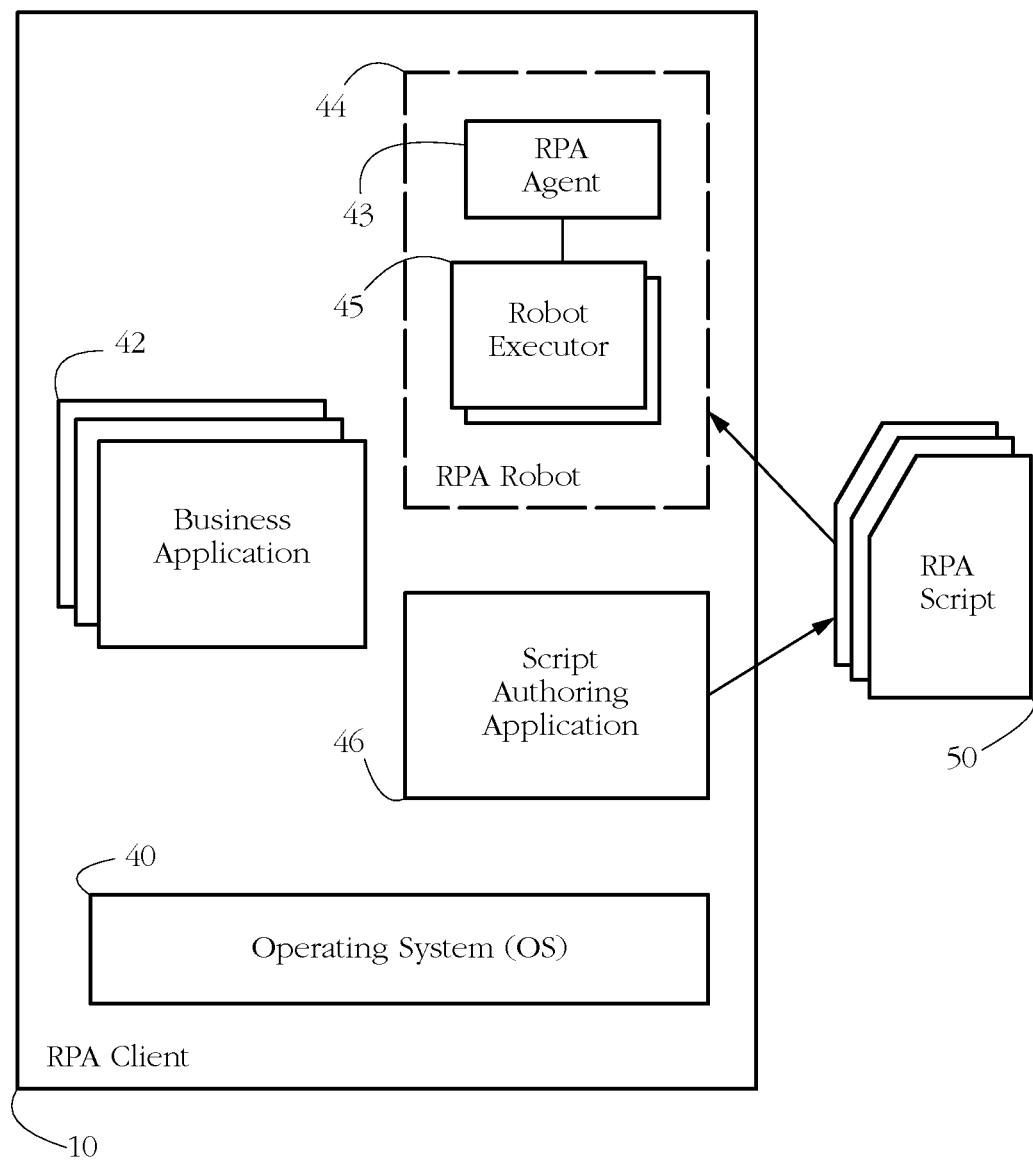
FIG. 2 shows exemplary software executing on an RPA client according to some embodiments of the present invention.

FIG. 2 shows exemplary software executing on an RPA client 10 according to some embodiments of the present invention. RPA client 10 may represent any of RPA clients 10a-e in FIG. 1. RPA client 10 executes an operating system (OS) 40, and a set of business applications 42. OS 40 may comprise any widely available operating system such as Microsoft Windows®, MacOS®, Linux®, iOS®, or Android®, among others, comprising a software layer that interfaces between applications 42 and the hardware of RPA client 10. Business applications 42 generically represent any computer program used by a human operator of RPA client 10 to carry out a task. Exemplary business applications 42 include, among others, a word processor, a spreadsheet application, a graphics application, a browser, a social media application, and an electronic communication application. At least one business application 42 is configured to expose a user interface (UI) that is targeted for automation as detailed below.

In some embodiments, RPA client 10 further executes an RPA robot 44 which comprises a set of interconnected computer programs that collectively implement an automation of a business process. An exemplary RPA robot is constructed using a Windows Workflow Foundation Application Programming Interface from Microsoft®, Inc. In some embodiments, RPA robot 44 executes within a separate, dedicated virtual machine instantiated on RPA client 10.

Components of RPA robot 44 include an RPA agent 43 and a set of robot executors 45. Robot executors 45 are configured to receive an RPA script 50 indicating a sequence of operations (also known in the art as activities) that mimic the actions of a human operator carrying out a business process, and to actually execute the respective sequence of operations on the respective client machine. RPA scripts 50 are typically process-specific, i.e., each distinct business process is described by a distinct set of RPA scripts. RPA script 50 may be formulated according to any data specification known in the art. In a preferred embodiment, RPA script 50 is encoded in a version of an extensible markup language (XML), but script 50 may also be formulated in a programming language such as C#, Visual Basic, Java, etc. Alternatively, RPA script 50 may be specified in an RPA-specific version of bytecode, or even as a sequence of instructions formulated in a natural language such as English, Spanish, Japanese, etc. In some embodiments, script 50 is pre-compiled into a set of native processor instructions (e.g., machine code).

In some embodiments, robot executor 45 comprises an interpreter (e.g., a just-in-time interpreter or compiler) configured to translate RPA script 50 into a runtime package comprising processor instructions for carrying out the operations described in the respective script. Executing script 50 may thus comprise executor 45 translating RPA script 50 and instructing a processor of RPA client 10 to load the resulting runtime package into memory and to launch the runtime package into execution.

RPA agent 43 may manage the operation of robot executors 45. For instance, RPA agent 43 may select tasks/scripts for execution by robot executor(s) 45 according to an input from a human operator and/or according to a schedule. Agent 43 may further configure various operational parameters of executor(s) 45. When robot 44 includes multiple executors 45, agent 43 may coordinate their activities and/or inter-process communication. RPA agent 43 may further manage communication between RPA robot 44 and other components of the RPA system illustrated in FIG. 1. Such components may execute on other RPA clients and/or a set of robot administration servers 11a-b. In one such example, servers 11a-b may operate a robot orchestrator service coordinating RPA activities across multiple client machines and enabling complex scheduling and/or license management. Servers 11a-b may further receive data from individual RPA robots indicating various intermediate values and/or results of executing RPA scripts. Such data may be used to generate activity reports, to enforce licensing agreements, and/or to mitigate malfunctions.

In some embodiments, RPA client 10 further executes a script authoring application 46 configured to enable a human operator of RPA client 10 to create RPA script 50 and thus effectively design a robot to perform a set of activities. Authoring application 46 may function like an integrated development environment (IDE), comprising a code editor and/or a user interface enabling the operator to interact with a set of tools for modeling a business process. An exemplary authoring application may allow a user to select a business application 42 and to indicate a desired manner of interacting with the respective application, e.g., to indicate a sequence of operations to be performed by robot 44. Exemplary operations include, for instance, opening a specific Excel® spreadsheet, reading data from a specific row/column of a data table, processing the respective data in a specific manner, clicking on a specific button, composing and sending an email message, navigating to a specific unified record location (URL), etc. In some embodiments, authoring application 46 outputs RPA scripts 50 in a format readable by RPA robot 44 (e.g., XML). RPA scripts 50 may be stored in a script repository 15 communicatively coupled to and accessible to RPA clients 10a-e via network 12 and/or 14 (see FIG. 1). In a preferred embodiment, script repository 15 is directly linked to robot administration server(s) 11a-b. Script repository 15 may be organized as a database, e.g., any structured data collection allowing a selective retrieval of scripts 50 according to a set of criteria.

A skilled artisan will appreciate that not all components illustrated in FIG. 2 need to execute on the same physical processor or machine. In typical RPA configurations, script development/robot design is carried out on one machine (commonly known in the art as 'design-side'). The resulting RPA script 50 is then distributed to multiple other users and machines for execution (usually known as 'runtime-side' or simply 'runtime').

Figure 3:
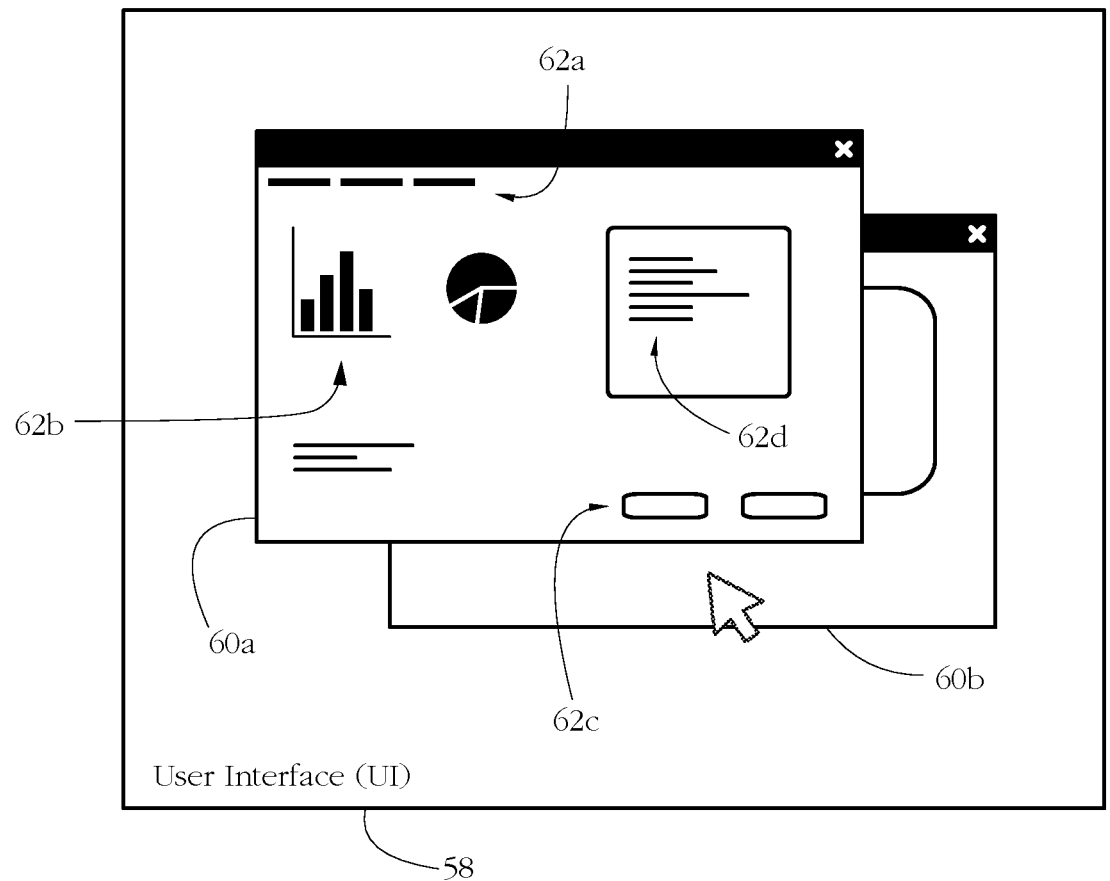
FIG. 3 shows an exemplary user interface (UI) comprising a plurality of UI elements according to some embodiments of the present invention.

FIG. 3 shows an exemplary user interface (UI) 58 according to some embodiments of the present invention. UI 58 may be exposed by any of business applications 42. A user interface is a computer interface that enables human-machine interaction, e.g., an interface configured to receive user input and to respond to the respective input. A common example of user interface is known as a graphical user interface (GUI), which enables human-machine interaction via a set of visual elements displayed to the user. Illustrative UI 58 has a set of exemplary windows 60a-b and a set of exemplary UI elements including a menu indicator 62a, an icon 62b, a button 62c, and a text box 62d. Other exemplary UI elements comprise, among others, a window, a label, a form, an individual form field, a toggle, a link (e.g., a hyperlink, hypertext, or a uniform resource identifier). UI elements may display information, receive input (text, mouse events), and/or control a functionality of software and/or the respective computer system.

Some UI elements are interactive in the sense that acting on them (e.g., clicking button 62c) triggers a behavior/reaction. Such behaviors/reactions are typically specific to the respective element or to a group of elements. For instance, clicking a save button produces a different effect to clicking a print button. The same keyboard shortcut (e.g., Ctrl-G) may have one effect when executed in one window/application, and a completely different effect when executed in another window/application. So, although the operation/action is the same (executing a click, pressing a combination of keyboard keys, writing a sequence of characters, etc.), the result of the respective action may depend substantially on the operand of the respective operation. An operand is herein defined as the UI element that is acted upon by a current operation/action such as a click or a keyboard event, or stated otherwise, the UI element selected to receive the respective user input. The terms 'target' and 'operand' are herein used interchangeably.

Figure 4:
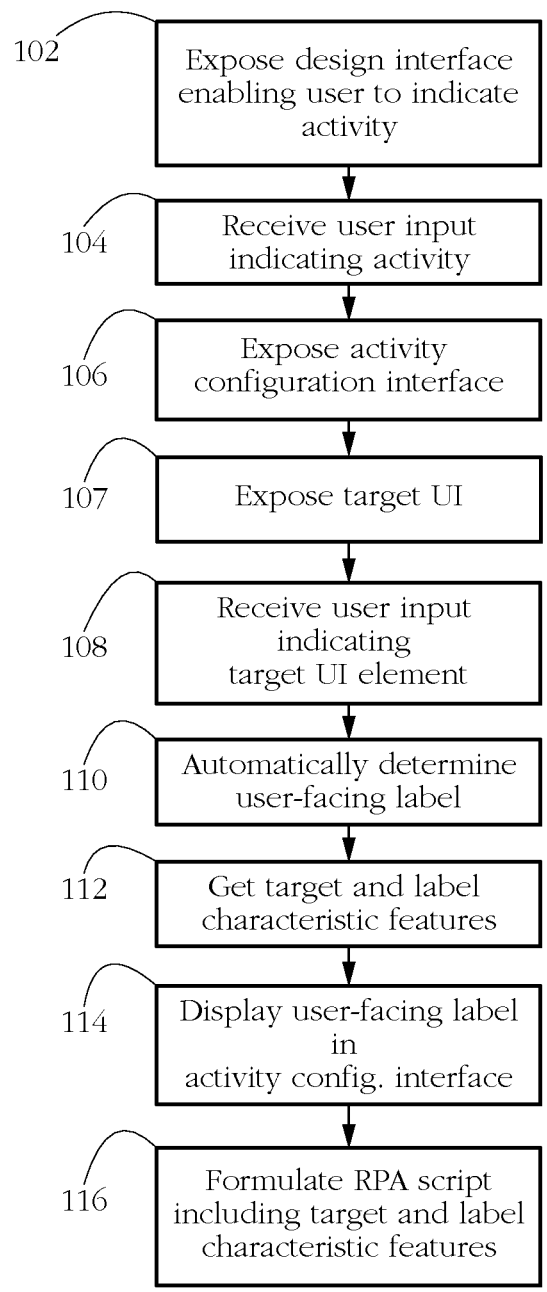
FIG. 4 shows an exemplary sequence of steps performed by a script authoring application according to some embodiments of the present invention.
Figure 5:
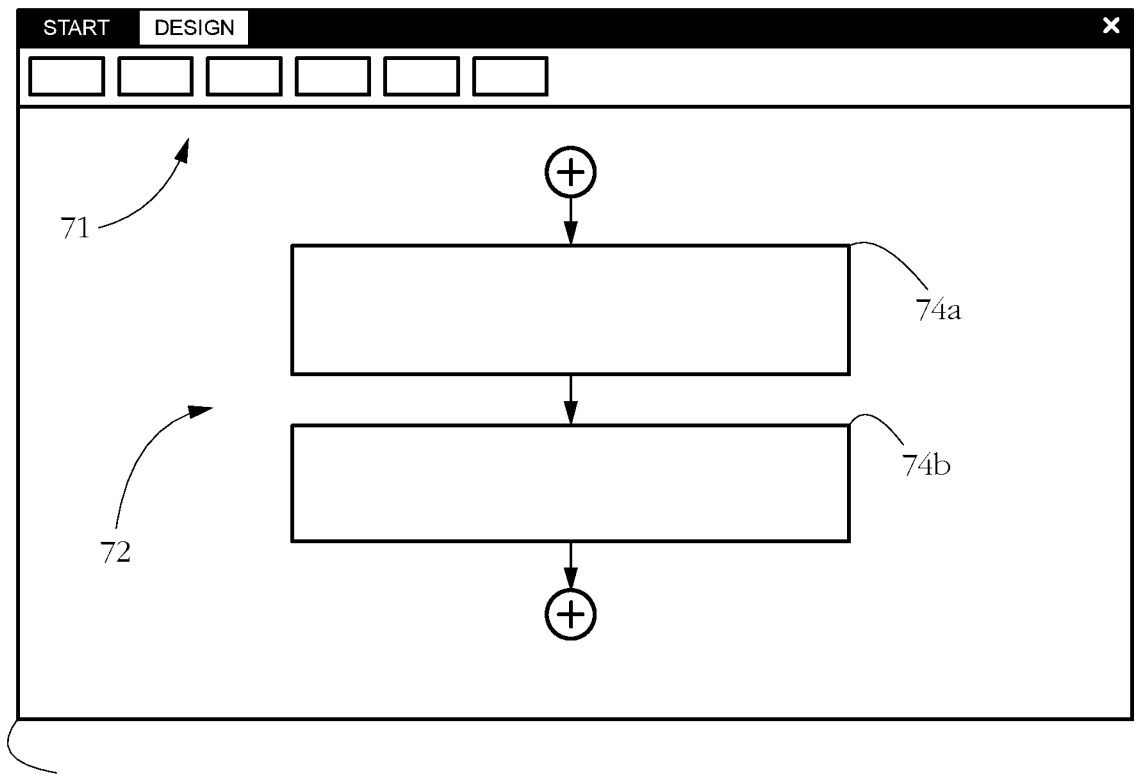
FIG. 5 illustrates an exemplary robot design UI according to some embodiments of the present invention.

FIG. 4 shows an exemplary sequence of steps performed by script authoring application 46 according to some embodiments of the present invention. In a step 102, application 46 may expose a robot design interface (e.g., a GUI) enabling a user to indicate a desired activity to be performed by robot 44. FIG. 5 illustrates such an exemplary robot design GUI 70 according to some embodiments of the present invention. GUI 70 comprises various regions, for instance a menu region 71 and a process design region 72. Menu region 71 enables a user to select individual RPA activities and indicate a target business application for automation, among others. In some embodiments, the activities may be reached via a hierarchy of menus. Activities may be grouped according to various criteria, for instance, according to a type of business application (e.g., MS Excel® activities, web activities, email activities), and/or according to a type of interaction (e.g., mouse activities, hotkey activities, data grabbing activities, form filling activities, etc.).

Process design region 72 displays a diagram a sequence of RPA activities, the sequence mimicking the flow of a business process currently being automated. The user may add, delete, and re-arrange activities of the sequence. Each activity may be configured independently, by way of an activity-specific activity configuration UI (illustrated as items 74a-b in FIG. 5). In some embodiments, user interfaces 74a-b may comprise children windows of GUI 70. Once the user has selected a type of activity (step 104 in FIG. 4), in a step 106 some embodiments expose an activity configuration UI structured according to the type of the respective activity (e.g., mouse click, data scraping, etc.), and display the respective configuration UI in a context of other members of the activity sequence.

Figure 6:
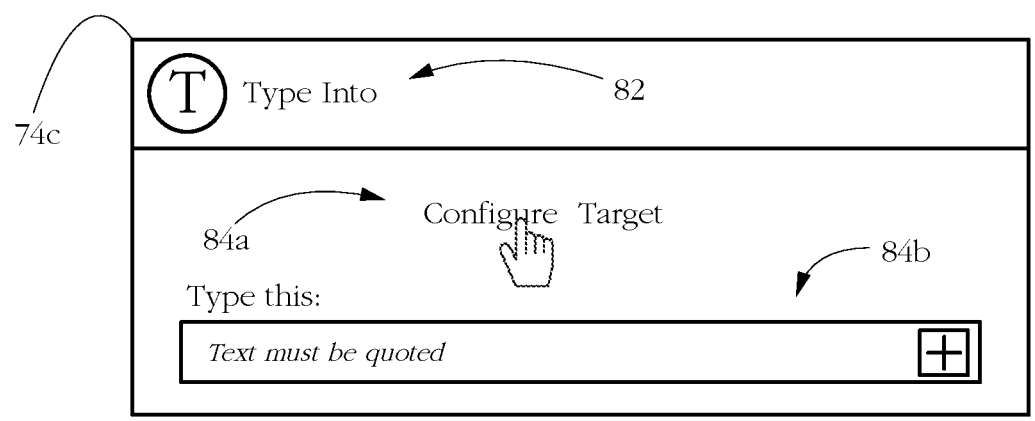
FIG. 6 shows an exemplary activity configuration UI according to some embodiments of the present invention.

FIG. 6 shows an exemplary appearance of an activity configuration interface 74c according to some embodiments of the present invention. Exemplary interface 74c configures a 'Type Into' activity (i.e., filling an input field of the target UI), and shows a set of fields, for instance an activity name field 82 and a set of activity parameter fields 84a-b. Activity name field 82 is configured to receive an indicator of an activity type of the current activity and an identifier of an operand/target of the current activity. Parameter fields 84a-b are configured to enable the user to set various parameters of the current activity. In the example of FIG. 6, a parameter is what is being written to the target input field. Field 84b may receive user input either in the form of text typed by the user, or in the firm of an indicator of a source of the respective input text. Exemplary sources may include a specific cell/column/row of a spreadsheet, a document located at a specified URL, another UI element from the target UI, etc.

Another exemplary parameter of the current RPA activity is the operand/target UI element of the respective activity. In one example wherein the activity comprises a mouse click, the target UI element may be a button, a menu item, a hyperlink, etc. In another example wherein the activity comprises filling out a form, the target UI element may be the specific form field that should receive the respective text input. Application 46 may enable the user to indicate the target UI element in various ways. For instance, it may invite the user to select the target element from a menu/list of candidate UI elements. In a preferred embodiment, a step 107 exposes a target UI, i.e., a design-side instance of a user interface of business application 42, which constitutes the object of the current automation. Exemplary target UIs include interfaces of Microsoft Excel®, a browser, an email program, etc. Exposing the target UI may include highlighting a subset of UI elements within the respective UI, and inviting the user to click on one to indicate a selection. In a step 108, application 46 may receive and process the user input indicating the selected target element, for instance by calling certain OS functions to detect the mouse click and identifying the clicked UI element.

Figure 7:
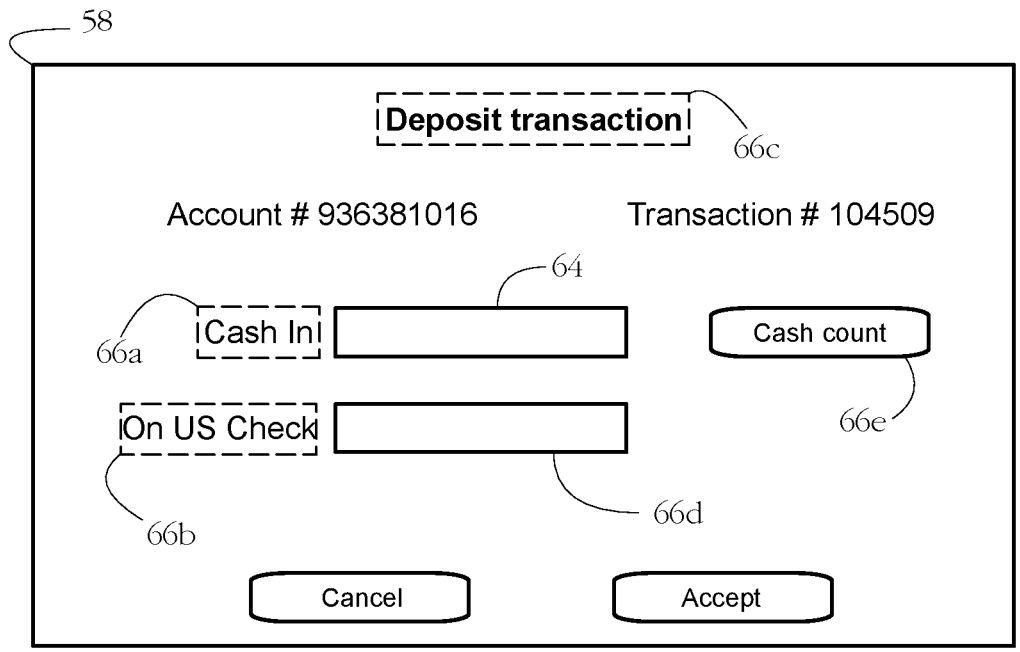
FIG. 7 illustrates an exemplary user interface, a target element, and a plurality of candidate label elements according to some embodiments of the present invention.

Next, in a step 110, some embodiments may automatically determine a user-facing label of the target element. A label element (or simply 'label') is herein defined as a UI element co-displayed with an associated target UI element. The modifier 'user-facing' is herein used to indicate that the label element is visible to the user by virtue of being a UI element displayed within the target UI, as opposed to a code label which is part of a source code of the respective UI and therefore typically not visible to the user (code labels will be further detailed below). The target and label elements typically have a semantic connection, for instance they both belong to the same group/container of UI elements, and/or they perform a function together. Exemplary label elements associated with an input field include, among others, a text label displayed next to the respective input field, and a title of a form that includes the respective input field. Exemplary label elements associated with a button include the text displayed on top of the respective button. Labels are not necessarily textual and may include images (e.g., an icon, a symbol, etc.). FIG. 7 shows an exemplary target UI 58 having a selected target element 64 and a plurality of potential label elements 66a-e according to some embodiments of the present invention.

Figure 8:
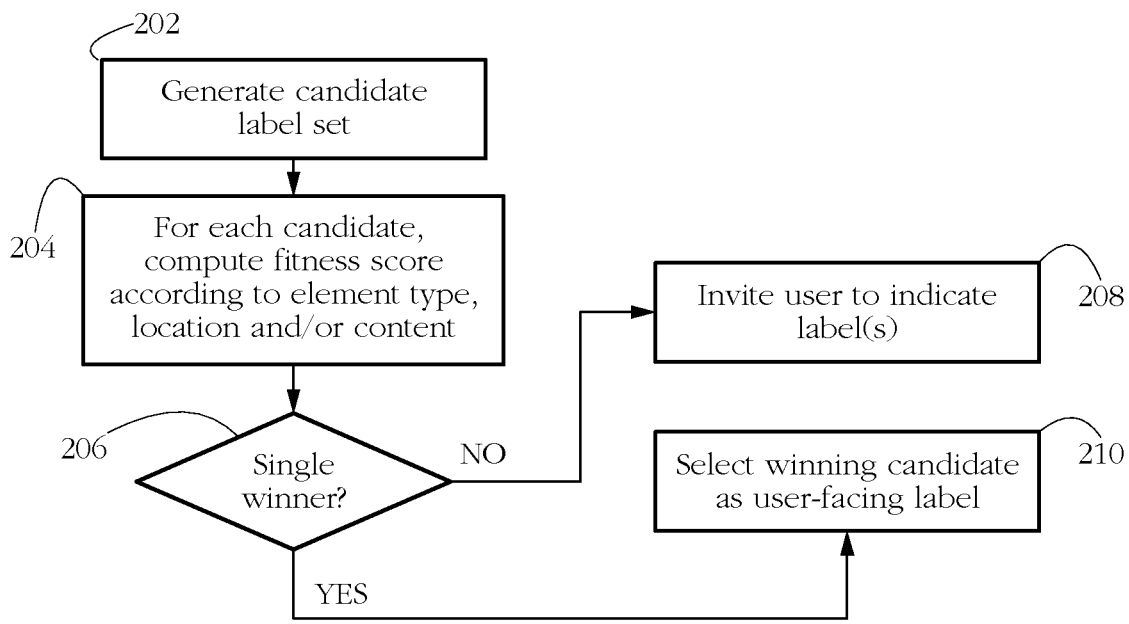
FIG. 8 shows an exemplary sequence of steps carried out to automatically determine a user-facing label associated with a target element, according to some embodiments of the present invention.

Determining the user-facing label of a target element (step 110 in FIG. 4) comprises selecting the label from a set of candidate UI elements, for instance from among candidate labels 66a-e in FIG. 7. FIG. 8 shows an exemplary method of automatically determining a label according to some embodiments of the present invention. In a step 202, application 46 may generate a set of candidate labels (see e.g., items 66a-e) selected from the set of UI elements displayed by target UI 58. The candidate label elements may be selected according to an element type of the respective target element (e.g., button, text, input field, etc.). In some embodiments, the candidate labels may be selected according to whether they belong to the same group of elements as the respective target. For instance, when the target element is a form field, some embodiments will select label candidates only from among UI elements belonging to the same form field. In the case of an HTML document, some embodiments may select label candidates from the same <div> or <span> container as the target element.

Next, in a step 204, application 46 may evaluate each candidate label according to a set of criteria. In some embodiments, step 204 comprises determining a label fitness score, which may combine multiple sub-scores evaluated according to distinct criteria. An exemplary criterion is a relative position of the candidate label with respect to the target element. The relative position may be determined according to a set of distances, an angle, and/or a degree of overlap between the respective target element and candidate label element.

Figure 9:
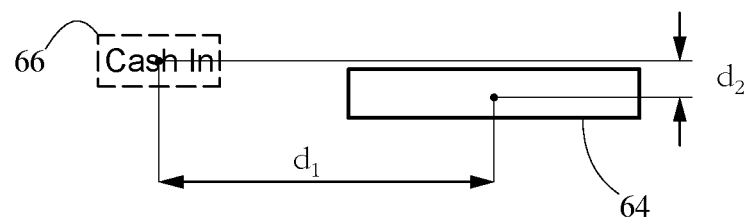
FIG. 9 shows a set of exemplary inter-element distances according to some embodiments of the present invention.

FIG. 9 shows a set of exemplary distances separating a target element 64 (in this example, an input field) from a candidate label 66 according to some embodiments of the present invention. Distances $d_1$ and $d_2$ are measured between the centers/centroids of the respective elements, along the principal coordinates of the screen (e.g., horizontal and vertical). For text elements detected using optical character recognition software (OCR), the distance may be measured to the center or centroid of a bounding box circumscribing the respective text element. Other exemplary inter-element distances, such as a Manhattan distance, Euclidean distance, etc., may be evaluated according to $d_1$ and $d_2$. Some embodiments rely on the observation that a reliable label is typically located in the vicinity of its target element, so a candidate label which is relatively closer to the target element may receive a relatively higher fitness score compared to another candidate label which is more distant. In such embodiments, an exemplary label fitness score may be determined according to $1/D$ or $(1-D/D_{max})$, wherein D denotes an inter-element distance determined according to $d_1$ and/or $d_2$ and $D_{max}$ denotes a pre-determined threshold beyond which two UI elements are considered not to be semantically related.

Figure 10:
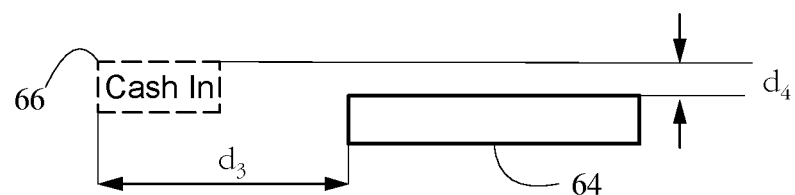
FIG. 10 shows another set of exemplary inter-element distances according to some embodiments of the present invention.

Another exemplary fitness score may be determined according to a degree of alignment between the candidate label and target element. Alignment may be determined according to another set of distances as illustrated for instance in FIG. 10. An exemplary distance $d_3$ separates a left edge of label candidate 66 from the left edge of target element 64. Meanwhile, a distance $d_4$ separates a top edge of label candidate 66 from a top edge of target element 64. Some embodiments rely on the observation that labels that reliably identify their targets are typically aligned with the respective targets. Therefore, in some embodiments, relatively small $d_3$ or $d_4$ distances may correspond to a relatively high label fitness score for the respective candidate label. FIG. 10 only shows distances that may be used to test left and/or top alignment; an artisan will understand that the illustrated distance measurements may be modified to test right and/or bottom alignment. An exemplary fitness score may be calculated as:

$$H(A) = \begin{cases} 1, \text{ when } A < A_{max} \\ 0, \text{ otherwise} \end{cases},$$

wherein A is a alignment distance determined according to $d_3$ and/or $d_4$ and $A_{max}$ is a predetermined threshold beyond which two UI elements are considered not to be aligned.

Figure 11:
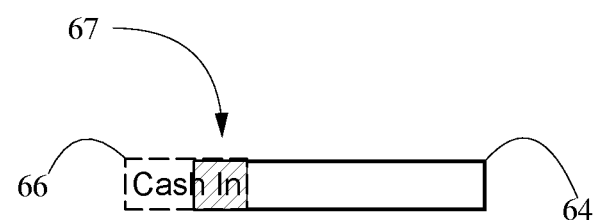
FIG. 11 illustrates an exemplary degree of overlap between two UI elements according to some embodiments of the present invention.

Yet another exemplary fitness score may be determined according to a degree of overlap between the label candidate and target elements. FIG. 11 shows an exemplary degree of overlap 67 according to some embodiments of the present invention, degree of overlap 67 determined as a proportion of one element intersecting the other element, or stated otherwise, how much of one element overlaps with the other. In such embodiments, two elements that do not intersect have zero overlap, whereas two elements wherein one element completely contains the other have 100% overlap. Some embodiments scores determined according to a degree of overlap to reliably identify labels for specific types of target elements (e.g., buttons). In one such example wherein the target element 64 is of the button type, application 46 may eliminate all label candidates that do not have a substantial degree of overlap with the target (e.g., more than 90%).

Other exemplary label fitness criteria may include an image and/or text content of the respective UI element. Some embodiments prefer text labels, so UI elements that do not contain text may receive a relatively lower label fitness score than other UI elements that display a fragment of text. Another exemplary criterion may be a length of the text displayed by the candidate UI element. In some embodiments, relatively small text elements may receive a relatively higher fitness score compared to text elements having a substantial amount of text.

Yet another exemplary criterion may include a count of label candidates that have a similar appearance, for instance a count of labels having identical texts. In one exemplary scenario, target UI 58 includes a form designed to collect data about multiple people and having multiple fields labeled 'Last Name'. In such situations, a 'Last Name' label may not be very reliable in identifying a specific form field. Therefore, some embodiments may determine whether each label candidate is unique (in the sense that there is no other label candidate having a similar image or displaying a similar text), and when no, assign the respective candidate label a relatively low anchor fitness score. An alternative embodiment may assign multiple labels to the same target element, for instance a label located in the proximity of the respective form field, and a title of the respective form or block of inputs.

A step 206 may compare scores evaluated for the label candidates. When there is a clear winner, in a step 210 script authoring application 46 may select the candidate UI element with the highest fitness score as user-facing label associated with the target element. When fitness label scores may not be evaluated, or when multiple candidates have the same fitness score, some embodiments may invite the user to explicitly indicate a UI element as user-facing label (step 208).

Figure 12:
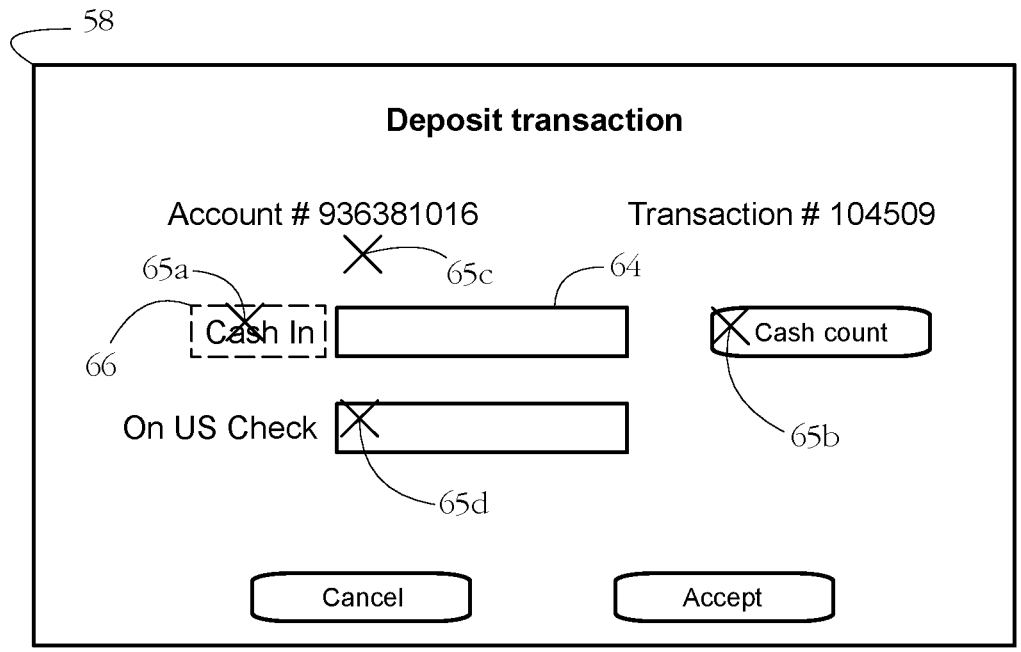
FIG. 12 shows an exemplary user interface, a target element, and a plurality of candidate label locations according to some embodiments of the present invention.
Figure 13:
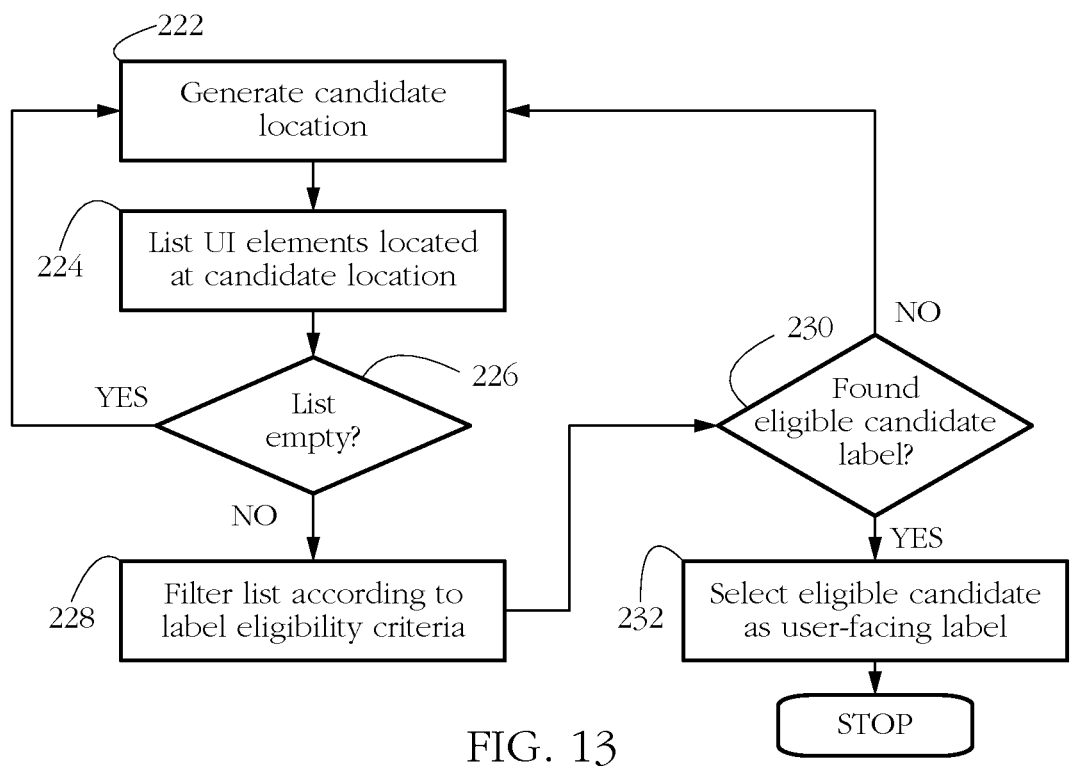
FIG. 13 shows an alternative sequence of steps carried out by a script authoring application to automatically identify a user-facing label according to some embodiments of the present invention.

An alternative method of automatically selecting a user-facing label element is illustrated in FIGS. 12-13. In contrast to the previously described method wherein application 46 generates a set of candidate labels and then evaluates their fitness according to their position with respect to the target element, a step 222 may generate a candidate location within UI 58, for instance as a pair of screen coordinates {X,Y}.

Such embodiments rely again on the observation that labels that unambiguously identify their associated target are usually close to, and aligned with, their respective target, for instance directly to their left, or directly above or below (the position may depend on the natural language of the respective UI). Therefore, some embodiments may explicitly look for potential label elements at such locations. FIG. 12 shows a plurality of candidate locations 65a-d surrounding target element 64. Such candidate locations may be determined according to a screen position of the target element, and/or according to a size of the target element. In some embodiments, the candidate location is generated randomly, for instance as a sum of a deterministic component and a random component.

Next, a step 224 may identify UI elements located at the candidate location. In some embodiments, an element is deemed to be located at a specific location when the respective location is within the screen bounds of the respective element. Another embodiment may consider an element to be located at specific location when a distance between a center/centroid of the respective element and the respective location is smaller than a pre-determined threshold. In the example of FIG. 12, UI element 66 is located at candidate location 65a. In some embodiments, step 224 comprises issuing a call to a native function of OS 40, the respective function configured to return a list of UI elements that occupy a specific region of the screen. Other methods of determining which UI elements are located at the candidate location include parsing a source code (e.g., HTML script, style sheet) underlying the respective UI.

When no UI element is located at the respective candidate location, some embodiments return to step 222 to generate another candidate location. Otherwise, in a step 226, script authoring application 46 may filter the identified set of UI elements according to a set of label fitness criteria. Such criteria may include, among others, visibility (e.g., only visible UI elements may be selected as labels) and element type (e.g., text elements may be preferred over other types of UI elements). Other fitness criteria may include a relative position of the candidate with respect to the target element, as described above.

When none of the UI elements located at the candidate location are deemed fit to be a label (for instance when none has received a fitness score that exceeds a pre-determined threshold), some embodiments may return to step 222 to generate another candidate location. Otherwise, a step 232 may select an eligible UI element as the user-facing label of the respective target element.

Figure 14:
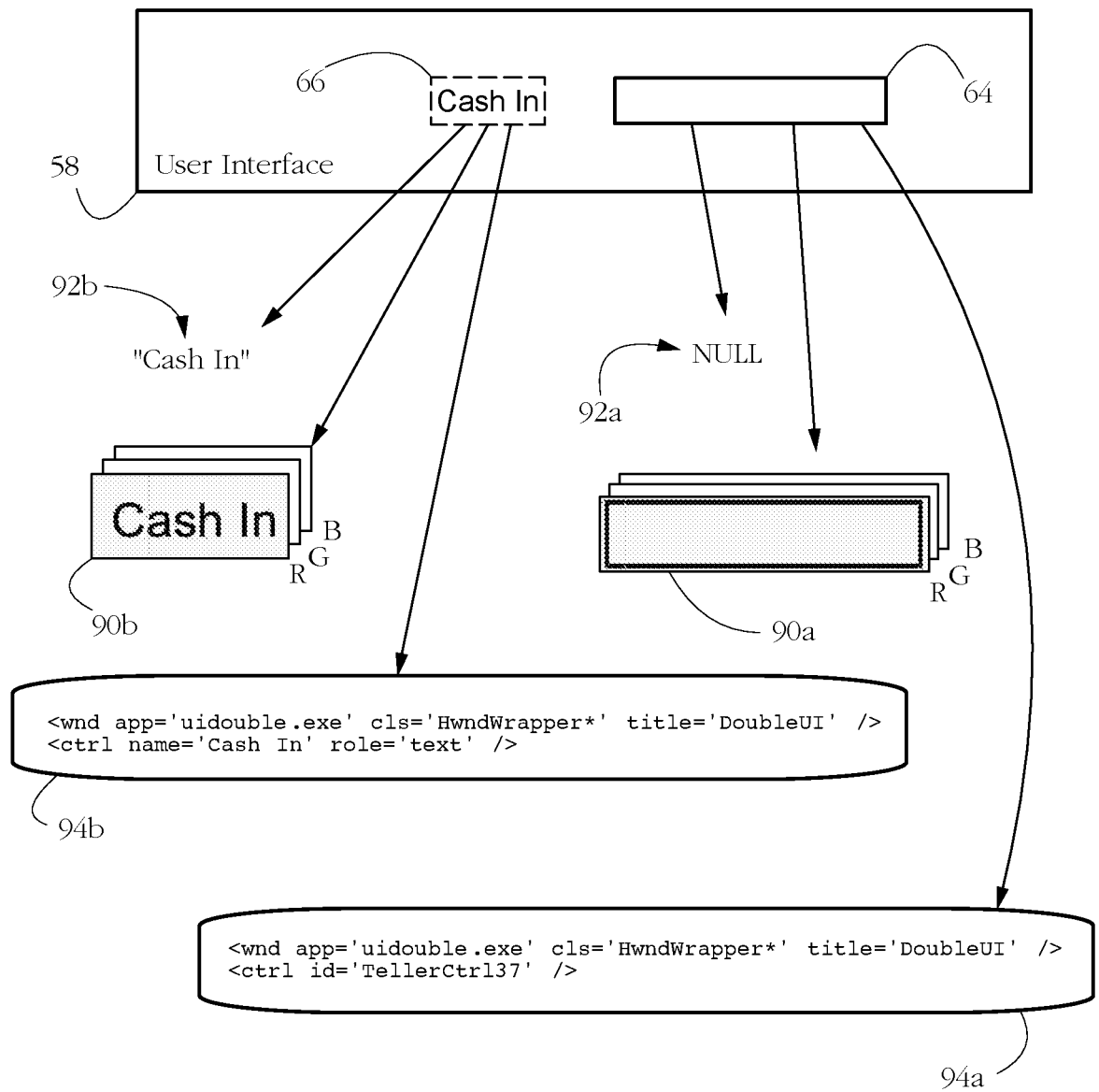
FIG. 14 illustrates various types of data characterizing a UI element according to some embodiments of the present invention.

In response to identifying the target and/or user-facing label, in a step 112 (FIG. 4) script authoring application 46 may determine a set of element-characteristic features of the respective target and label elements. Such element-characteristic data according to some embodiments of the present invention are illustrated in FIG. 14, and include, among others, a set of element images 90a-b, a set of element texts 92a-b, and a set of code labels 94a-b of target element 64 and associated label 66, respectively.

Code labels 94a-b identify each UI element within a source code of target UI 58. The term source code of a user interface is herein understood to denote a programmatic representation of a content displayed by the respective user interface. Source code may encompass a program/script written in a programming language, as well as a data structure residing in a memory of RPA client 10. Exemplary source code comprises a HTML document which is rendered as a webpage by a web browser application.

Code labels 94a-b identify the respective UI element to the operating system, for instance as a specific object within a hierarchy of objects (UI tree) that RPA client 10 uses to manage the display of UI 58. The illustrated code label 94a (FIG. 14) comprises a set of attribute-value pairs that identify target element 64 as an object named 'TellerCtrl37' visible within a window of a business application called 'uidouble.exe'. Meanwhile, code label 94b identifies label 66 as a text element named "Cash In" forming a part of the same application window as target element 64. The illustrated format of code labels 94a-b is provided only as an example; a skilled artisan will appreciate that there may be multiple other ways of programmatically representing a UI element, beside a list of attribute-value pairs.

In some embodiments, determining code labels 94a-b comprises parsing a computer program/script underlying UI 58 and/or parsing a data structure used by OS 40 and/or business application 42 to manage the display of UI 58, and extracting a set of attribute-value pairs characterizing the respective UI element.

In some embodiments, each element text 92a-b (FIG. 14) comprise a computer encoding of a text (sequence of alphanumeric characters) displayed within the screen boundaries of the respective UI element. In the illustrated example, element text 92a has a value NULL, since target element 64 does not display any text. Meanwhile, element text 92b consists of the text 'Cash In'. The computer encoding of a text may include, for instance, a sequence of numeric character codes (e.g., Unicode), wherein each code corresponds to a distinct character of element texts 92a-b.

Embodiments of script authoring application 46 may determine element texts 92a-b using various methods. When application 46 has access to a source code of UI 58, application 46 may attempt to extract element texts 92a-b from the respective source code. For instance, the label displayed on a button of a web page can be found by parsing the HTML document associated with the respective web page. In the case of other business applications 42, script authoring application 46 may parse a data structure of OS 40 and/or business application 42 to determine whether element texts 92a-b are included in a source code of UI 58.

In an alternative embodiment, application 46 may employ image analysis tools such as an optical character recognition (OCR) computer program to determine element texts 92a-b. In one such example, an OCR tool may input an image of a screen region including the respective the target and/or label UI elements, and return a set of text tokens (e.g., words) and a bounding box determined for each text token. Exemplary bounding boxes include, among others, a polygon circumscribing the respective text token, and a convex hull of the respective token. A bounding box is illustrated by the dashed rectangle surrounding the words 'Cash In' in FIG. 14. In response to receiving text tokens and bounding boxes, application 46 may determine whether any bounding box substantially overlaps the respective UI element, and when yes, select the text token located within the respective bounding box as the element text characterizing the respective UI element. Substantial overlap may be established when a sufficient proportion (e.g., more than 50%, typically 80-100%) of the respective bounding box is located within the screen bounds of the respective UI element.

In some embodiments, each element image 90a-b (FIG. 14) comprise a computer encoding of an image displayed on screen within the boundaries of the respective UI element. The computer encoding of the image may include an array of pixel values corresponding to the respective screen region, possibly over multiple channels (e.g., RGB), and/or a set of values computed according to the respective array of pixel values (e.g., a JPEG or wavelet representation of the respective array of pixel values). Determining each element image 90a-b may comprise grabbing a content of a clipping of UI 58, i.e., of a limited region of UI 58 showing the respective UI element.

In response to the target selection and automatic label identification, in a step 114 (FIG. 4) script authoring application 46 may populate the activity configuration interface of the respective RPA activity with information about the target UI element and/or other activity parameters. In an exemplary embodiment, the appearance of the activity configuration interface may switch from the exemplary display in FIG. 6 to the exemplary display in FIG. 15 in response to receiving a selection of target element. To increase readability and make the conveyed information user friendly and intuitive, some embodiments may reference the target/operand of the respective activity by the user-facing label 66 associated with the respective target (label 66 detected in step 110, FIG. 4). Stated otherwise, in presenting information to the user, the activity configuration interface may use the user-facing label as a descriptor and/or substitute for the respective target element. For instance, some embodiments may populate activity name field 82 (FIG. 6) with an activity name determined according to the user-facing label instead of according to the target element per se. The activity name may be constructed, for instance, by concatenating a text indicator of an activity type (e.g., 'Type Into') with an element text 92c of the user-facing label (e.g., 'Cash In'). In an alternative embodiment, the activity name field may display an image (e.g., icon) of respective user-facing label, as opposed to its text content.

The illustrated activity configuration interface 74d further comprises an activity description field 86 showing a summary of the respective RPA activity. In some embodiments, field 86 displays characteristic data of the user-facing label and/or target element, for instance an image 90c of the user-facing label and an image 90d of the target element. Alternative embodiments may display element text instead of or in addition to the element image.

Figure 15:
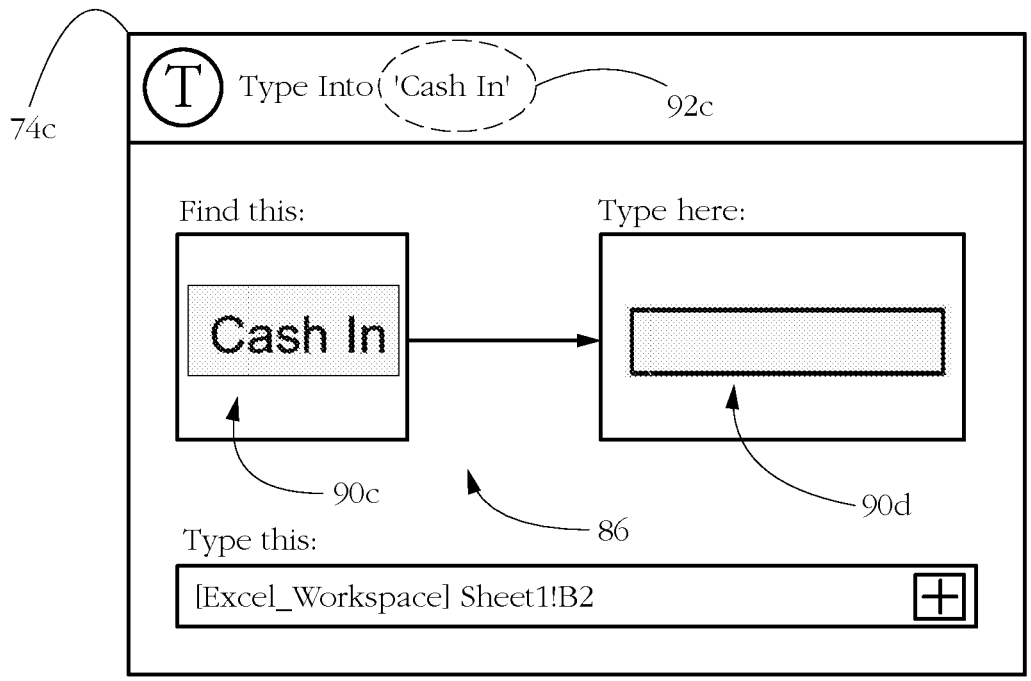
FIG. 15 shows an exemplary activity configuration UI showing details of a data input activity according to some embodiments of the present invention.
Figure 16:
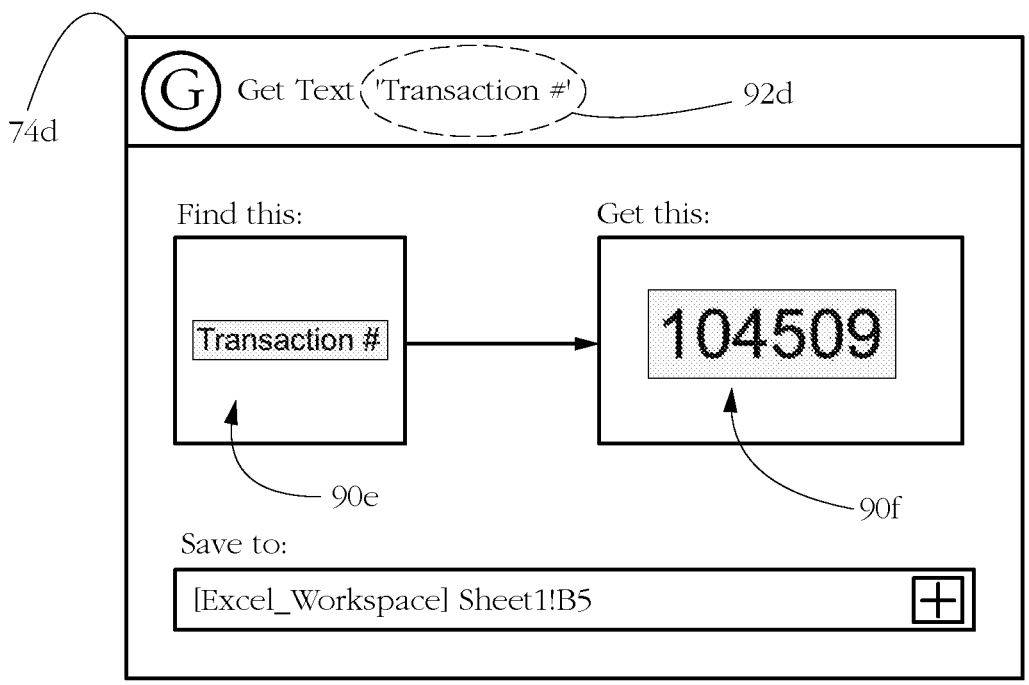
FIG. 16 shows another example of the activity configuration UI showing details of a data scraping activity according to some embodiments of the present invention.

FIG. 16 shows another exemplary activity configuration interface 74d exposed in relation to a text grabbing activity. With reference to FIG. 7, the illustrated exemplary activity instructs the robot to grab a transaction number from UI 58. In contrast to the situation of FIG. 15, now both the target element (the actual transaction number) and its user-facing label ('Transaction #') are text elements. Interface 74d displays an activity name determined according to a text 92d of the user-facing label, i.e., again uses the user-facing label as a substitute/descriptor for the true target, to improve readability and make the current activity more accessible to non-coding developers. An activity description displays images of the respective target element and its user-facing label (items 90f and 90e, respectively).

Figure 17:
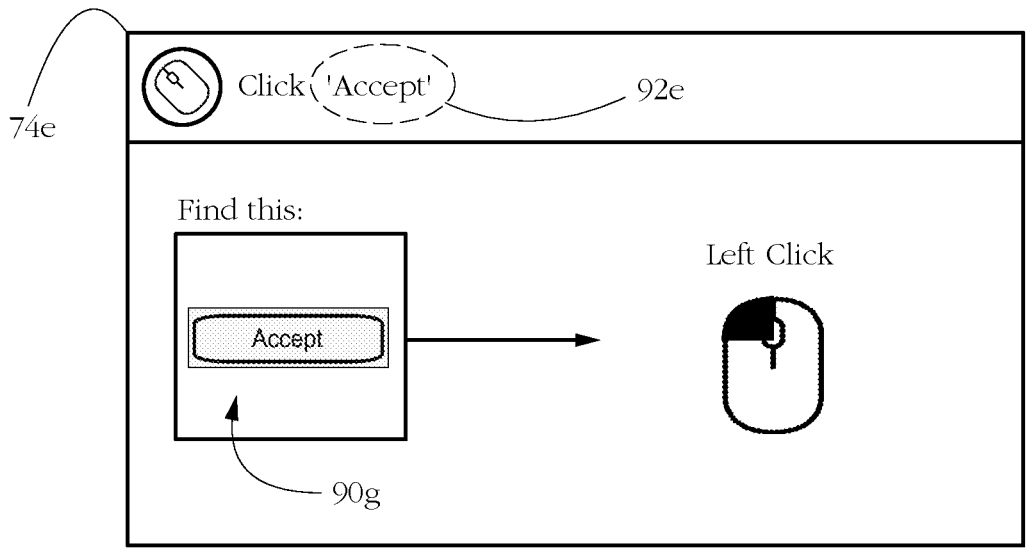
FIG. 17 shows yet another example of the activity configuration UI showing details of a mouse click activity according to some embodiments of the present invention.

FIG. 17 show yet another exemplary activity configuration interface 74e exposed in relation to a mouse click activity. With reference to FIG. 7, the illustrated activity instructs the robot to click the 'Accept' button of UI 58. Some embodiments identify the user-facing label of a button element as being the text element displayed on top of the respective button, in this case the text element 'Accept' co-located with the button itself. In such embodiments, interface 74c displays an activity name determined according to a text 92e displayed on the button.

In a further step 116 (FIG. 4), script authoring application 46 may formulate an RPA script corresponding to the selected RPA activity. Stated otherwise, in step 116, application 46 outputs the robot's code to be used at runtime, for instance to a script file. RPA script 50 may be formulated in any computer-readable encoding known in the art, for instance in a version of XML or even compiled into a sequence of native processor instructions (e.g., machine code).

For each activity/automation step, authoring application 46 may output to RPA script 50 an indicator of the respective activity (e.g., click, type into, etc.) and element-characteristic features determined in step 112 for the respective target element and user-facing label. Such data may include, among others, a code label, an element text, and an element image for the respective UI elements. Encodings of characteristic data may include the characteristic data itself and/or other representations of such data, for instance an indicator of a network location (e.g., URL, network address) where the respective data can be accessed remotely.

Figure 18:
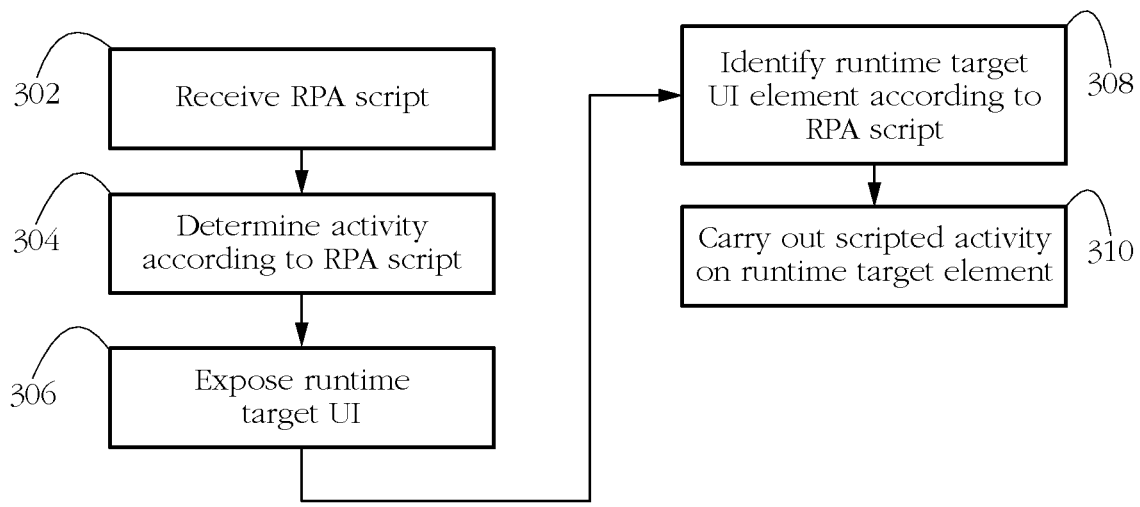
FIG. 18 shows an exemplary sequence of steps performed by a software robot at runtime according to some embodiments of the present invention.

Once the design phase of automation is complete, RPA script 50 may be transmitted to script repository 15 and/or distributed to other RPA clients for execution (see e.g., FIG. 1). FIG. 18 shows an exemplary sequence of steps carried out by RPA robot 44 at runtime. In response to receiving RPA script 50, a step 304 determines a type of activity to be performed according to a content of RPA script 50. Step 304 may further determine a target UI and/or a runtime business application (e.g., MS Excel®, Google Chrome®, etc.) that the respective robot is configured to interact with according to RPA script 50. In a step 306, RPA robot 44 may expose the respective target UI, for instance by invoking an instance of the respective business application on the local client machine. A further step 308 may automatically identify a runtime target UI element for the respective activity according to information stored in RPA script 50. The runtime target UI element comprises the operand of the respective activity, i.e., the UI element of the runtime target UI that robot 44 is configured to act upon (e.g. to click, to enter some text into, to grab the contents of, etc.). The runtime target may be identified, for instance according to a code label of the respective UI element, and/or according to a text and/or image displayed by the respective UI element. Some embodiments further identify the runtime target according to characteristic data determined at design-time for a user-facing label associated with a design-time instance of the target element. In response to a successful identification of a runtime target element, a step 310 may automatically carry out the scripted activity, i.e., interact with the respective UI element as indicated in RPA script 50.

Figure 19:
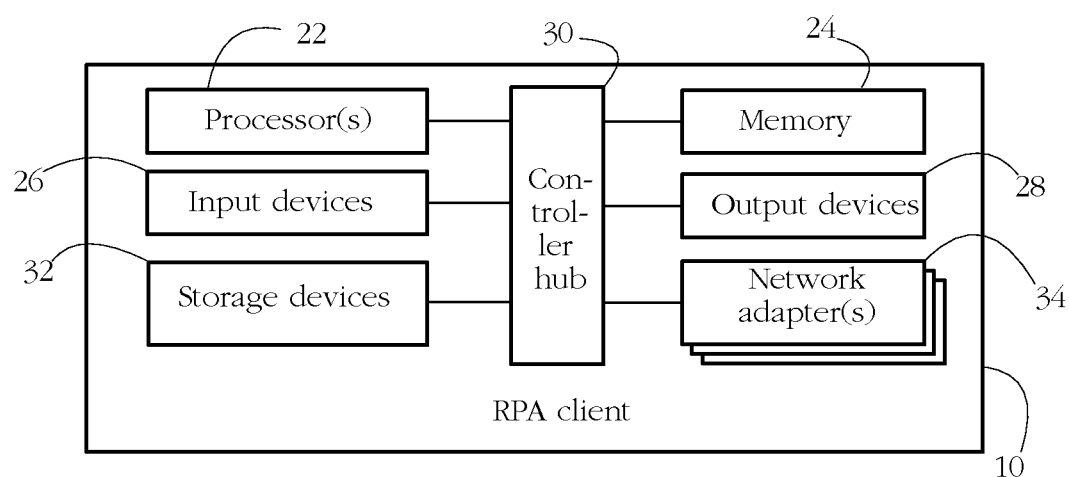
FIG. 19 illustrates an exemplary embodiment of a computing device configured to carry out methods described herein.

FIG. 19 shows an exemplary hardware configuration of a computing device programmed to execute some of the methods described herein. The respective computing device may represent any of RPA clients 10a-e in FIG. 1, for instance a personal computer as illustrated in FIG. 19. Other computing devices such as mobile telephones, tablet computers, and wearables may have slightly different configurations. Processor(s) 22 comprise a physical device (e.g. microprocessor, multi-core integrated circuit formed on a semiconductor substrate) configured to execute computational and/or logical operations with a set of signals and/or data. Such signals or data may be encoded and delivered to processor(s) 22 in the form of processor instructions, e.g., machine code. Processor(s) 22 may include a central processing unit (CPU) and/or an array of graphics processing units (GPU).

Memory unit 24 may comprise volatile computer-readable media (e.g. dynamic random-access memory—DRAM) storing data/signals/instruction encodings accessed or generated by processor(s) 22 in the course of carrying out operations. Input devices 26 may include computer keyboards, mice, and microphones, among others, including the respective hardware interfaces and/or adapters allowing a user to introduce data and/or instructions into RPA client 10. Output devices 28 may include display devices such as monitors and speakers among others, as well as hardware interfaces/adapters such as graphic cards, enabling the respective computing device to communicate data to a user. In some embodiments, input and output devices 26-28 share a common piece of hardware (e.g., a touch screen). Storage devices 32 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 34 enable the respective computing device to connect to an electronic communication network (e.g., networks 12 and 14 in FIG. 1) and/or to other devices/computer systems.

Controller hub 30 generically represents the plurality of system, peripheral, and/or chipset buses, and/or all other circuitry enabling the communication between processor(s) 22 and the rest of the hardware components of RPA client 10. For instance, controller hub 30 may comprise a memory controller, an input/output (I/O) controller, and an interrupt controller. Depending on hardware manufacturer, some such controllers may be incorporated into a single integrated circuit, and/or may be integrated with processor(s) 22. In another example, controller hub 30 may comprise a northbridge connecting processor 22 to memory 24, and/or a southbridge connecting processor 22 to devices 26, 28, 32, and 34.

The exemplary systems and methods described above facilitate the design of RPA robots by making the robot design process more intuitive and accessible to developers that lack a formal programming background.

When designing robotic software (a stage of automation commonly known as design-time), the RPA developer invokes an instance of the target UI and indicates a target element and an activity to be performed on the respective target element. For instance, the developer may indicate a button of the target UI and configure the robot to click on the respective button. In another example, the developer may indicate an input field and configure the robot to type some text into the respective input field. In yet another example, the developer may indicate a text box of the user interface and configured the robot to grab the content of the respective text box. The resulting robot code may include an indicator of the target element and an indicator of the respective activity.

The robot code may then be distributed to RPA clients.

RPA systems may identify a target element according to its code label—a feature of the source code underlying the respective user interface (for instance, the HTML code that specifies the appearance and content of a webpage). However, the code label of a target UI element may not provide insight to a developer as to the type, appearance, or screen location of the respective UI element. Understanding a user interface's source code may require lengthy training and may not be an option for developers lacking a formal programming training. Referring to UI elements by their source code label may further hinder portability and collaborative development wherein multiple designers collaborate on the same RPA software. Names derived from source code may be transparent to some developers, but not to others who may be less familiar with the architecture of the respective target UI.

Some embodiments rely on the observation that human users of a UI typically conflate an interactive element (e.g., form field, button) with its label, in contrast to a robot/computer system that clearly distinguishes the UI element from its label. For instance, users often say "I clicked OK", when the actual operation they performed was clicking on a button displaying the OK label. Similarly, a user may say "I am filling out the Last Name", when "Last name" is actually the label displayed next to the respective input field, as opposed to the field itself. Meanwhile, successful RPA requires that the robot acts on the target element itself, and not its associated label.

Therefore, in user-facing aspects of a robot design interface, some embodiments deliberately use a label as identifier and/or substitute for an actual target element. In one such example shown in FIG. 15, script authoring application 46 instructs robot 44 to type into an input field identified as having code label 'TellerCtrl37'. However, the user-facing activity configuration interface illustrated in FIG. 15 shows the respective activity as "Type into 'Cash In'" instead of, for instance "Type into 'TellerCtrl37'". Such user-oriented communication may substantially facilitate understanding of the respective design tools and make RPA authoring attractive and accessible to non-coders.

In another exemplary UI improvement, some embodiments use an image of a target element or its associated user-facing label as substitute for the target element itself. The respective image may comprise a clipping of the actual target UI, and shows the on-screen appearance of the target element and/or label, including the actual color scheme, font, and font size used to render the respective elements within the target UI. One such example is shown in FIG. 16, wherein the target element (actual transaction number) is represented as an image. Such representations enable even non-technical users to immediately identify the target element within the UI and understand what the robot is designed to do.

It will be clear to one skilled in the art that the above embodiments may be altered in many ways without departing from the scope of the invention. Accordingly, the scope of the invention should be determined by the following claims and their legal equivalents.

What is claimed is:

1. A method of designing robotic process automation (RPA) software, the method comprising employing at least one hardware processor of a computer system to:
   in response to receiving a user input selecting an RPA activity from a plurality of RPA activities available for execution by an RPA robot, expose an activity configuration user interface (UI) enabling a user to configure parameters of the RPA activity;
   in response to receiving a user input selecting a target element for the RPA activity from a plurality of UI elements displayed within a target UI,
   automatically determine a user-facing label of the target element according to a relative on-screen position of the user-facing label with respect to the target element;
   in response to determining the user-facing label, display the user-facing label within a name field of the activity configuration UI, the name field indicating an activity name of the RPA activity; and
   determine a code label characterizing the target element within a source code of the target UI;
   wherein executing the RPA activity on a client machine causes the client machine to:
      automatically identify a runtime instance of the target element within a runtime UI exposed by the client machine, the runtime instance of the target element identified according to the code label, and automatically carry out an operation that reproduces a result of an interaction of a human operator with the runtime instance of the target element, the operation determined according to the RPA activity.

2. The method of claim 1, wherein displaying the user-facing label comprises:

extracting a text content of the user-facing label; and
displaying the text content within the name field of the activity configuration UI.

3. The method of claim 1, wherein displaying the user-facing label comprises displaying a clipping of an image of the target UI within the name field of the activity configuration UI, the clipping showing the user-facing label.

4. The method of claim 1, further comprising, in response to receiving the user input selecting the target element, displaying a clipping of an image of the target UI within the activity configuration UI, the clipping showing the target element.

5. The method of claim 1, wherein the interaction comprises an item selected from a group consisting of performing a mouse click on the runtime instance of the target element, pressing a specific combination of keyboard keys, writing a sequence of characters into the runtime instance of the target element, grabbing an image of the runtime instance of the target element, and grabbing a text displayed by the runtime instance of the target element.

6. The method of claim 1, wherein the target element comprises an item selected from a group consisting of a UI window, a menu, a button, a text area, and an input field.

7. A computer system comprising at least one hardware processor configured to:

in response to receiving a user input selecting a robotic process automation (RPA) activity from a plurality of RPA activities available for execution by an RPA robot, expose an activity configuration UI enabling a user to configure parameters of the RPA activity;

in response to receiving a user input selecting a target element for the RPA activity from the plurality of UI elements displayed within a target UI, automatically determine a user-facing label of the target element according to a relative on-screen position of the user-facing label with respect to the target element;

in response to determining the user-facing label, display the user-facing label within a name field of the activity configuration UI, the name field indicating an activity name of the RPA activity; and determine a code label characterizing the target element within a source code of the target UI;

wherein executing the RPA activity on a client machine causes the client machine to:

automatically identify a runtime instance of the target element within a runtime UI exposed by the client machine, the runtime instance of the target element identified according to the code label, and automatically carry out an operation that reproduces a result of an interaction of a human operator with the runtime instance of the target element, the operation determined according to the RPA activity.

8. The computer system of claim 7, wherein displaying the user-facing label comprises:

extracting a text content of the user-facing label; and
displaying the text content within the name field of the activity configuration UI.

9. The computer system of claim 7, wherein displaying the user-facing label comprises displaying a clipping of an image of the target UI within the name field of the activity configuration UI, the clipping showing the user-facing label.

10. The computer system of claim 7, further comprising, in response to receiving the user input selecting the target element, displaying a clipping of an image of the target UI within the activity configuration UI, the clipping showing the target element.

11. The computer system of claim 7, wherein the interaction comprises an item selected from a group consisting of performing a mouse click on the runtime instance of the target element, pressing a specific combination of keyboard keys, writing a sequence of characters into the runtime instance of the target element, grabbing an image of the runtime instance of the target element, and grabbing a text displayed by the runtime instance of the target element.

12. The computer system of claim 7, wherein the target element comprises an item selected from a group consisting of a UI window, a menu, a button, a text area, and an input field.

13. A non-transitory computer-readable medium storing instructions which, when executed by at least one hardware processor of a computer system configured to expose a target user interface (UI) comprising a plurality of UI elements, cause the computer system to:

in response to receiving a user input selecting a robotic process automation (RPA) activity from a plurality of RPA activities available for execution by an RPA robot, expose an activity configuration UI enabling a user to configure parameters of the RPA activity;

in response to receiving a user input selecting a target element for the RPA activity from a plurality of UI elements displayed within the target UI, automatically determine a user-facing label of the target element according to a relative on-screen position of the user-facing label with respect to the target element;

in response to determining the user-facing label, display the user-facing label within a name field of the activity configuration UI, the name field indicating an activity name of the RPA activity; and determine a code label characterizing the target element within a source code of the target UI;

wherein executing the RPA script on a client machine causes the client machine to:

automatically identify a runtime instance of the target element within a runtime UI exposed by the client machine, the runtime instance of the target element identified according to the code label, and automatically carry out an operation that reproduces a result of an interaction of a human operator with the runtime instance of the target element, the operation determined according to the RPA activity.

14. The method of claim 2, further comprising employing the at least one hardware processor to further display a clipping of an image of the target UI within the activity configuration UI, the clipping showing the user-facing label.

15. The computer system of claim 8, wherein the at least one hardware processor is further configured to display a clipping of an image of the target UI within the activity configuration UI, the clipping showing the user-facing label.

16. The method of claim 1, wherein the user-facing label comprises an icon, and wherein displaying the user-facing label comprises displaying the icon within the name field of the activity configuration UI.

17. The computer system of claim 7, wherein the user-facing label comprises an icon, and wherein displaying the user-facing label comprises displaying the icon within the name field of the activity configuration UI.

18. The method of claim 1, wherein the at least one hardware processor is configured to determine the user-facing label according to an on-screen distance between the user-facing label and the target element.

19. The computer system of claim 7, wherein the at least one hardware processor is configured to determine the user-facing label according to an on-screen distance between the user-facing label and the target element.

\* \* \* \* \*